Nov. 2, 1948.  H. YATES  2,452,824
WORK HOLDER
Filed Sept. 12, 1945  5 Sheets-Sheet 4

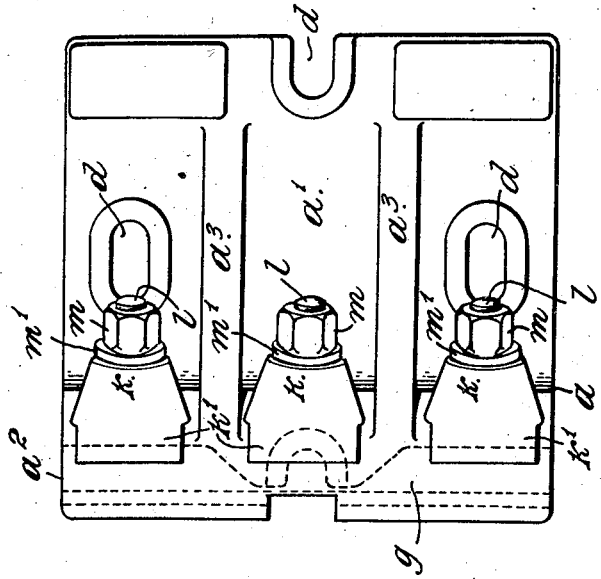
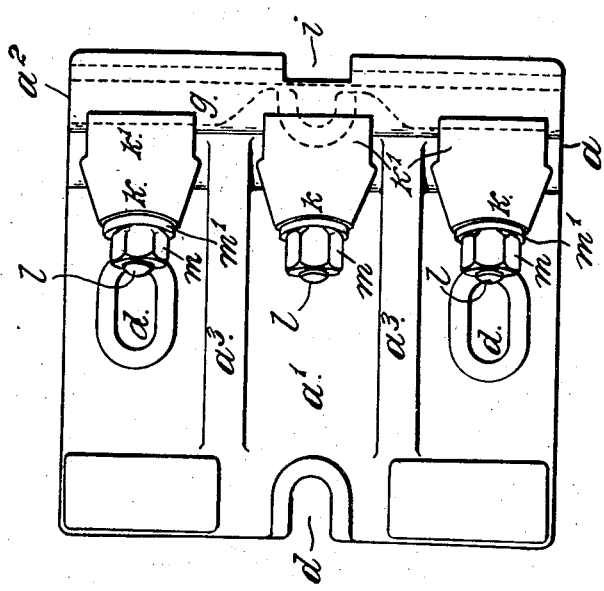
Fig. 2
Inventor.
HERBERT YATES.
By: Francis E. Boyce
ATTORNEY.

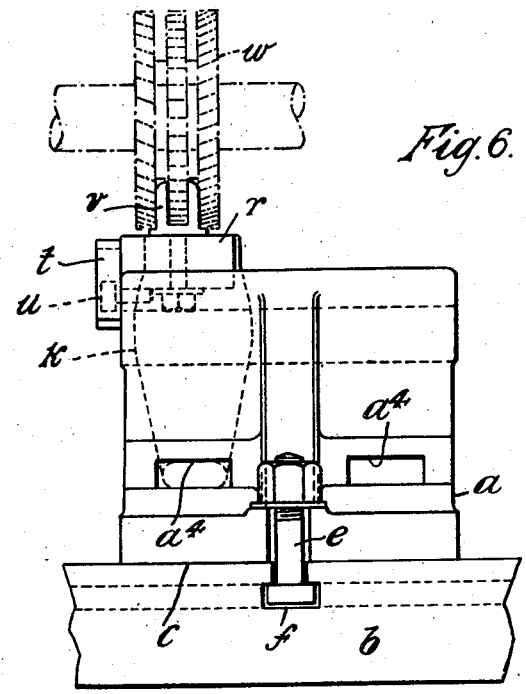
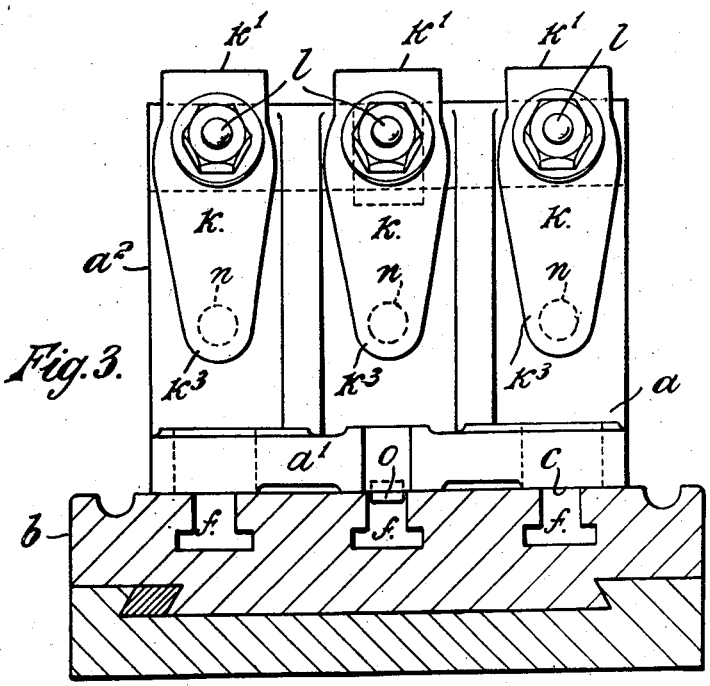

Inventor.
HERBERT YATES.
By: Francis E. Boyce
ATTORNEY.

Patented Nov. 2, 1948

2,452,824

UNITED STATES PATENT OFFICE 2,452,824

WORK HOLDER

Herbert Yates, Kingsbury, London, England

Application September 12, 1945, Serial No. 615,780
In Great Britain October 10, 1944

6 Claims. (Cl. 90—60)

This invention relates to devices for holding work pieces on the work tables of machine tools, such as metal milling, shaping, planing, facing and boring machines.

The object of the invention is to provide a work piece holder which will securely hold a work piece even presenting rough or non-parallel surfaces to the clamping effect of the holder, and of which the clamping force has a component directed towards the work table, and thus prevents lifting of the work piece therefrom.

The invention provides a universal work piece holder which avoids the necessity for the provision of costly milling and planing fixtures for suspending a work piece, such as usually have to be specially made when awkward shaped castings, flanged boxes and the like are to be machined.

To the above end, the work piece holder according to the invention consists of a pair of brackets adapted to be bolted to a work table of a machine tool in opposed mutually separated parallel positions, each presenting a flat upper surface parallel to and equidistant from an undersurface contacting the work table, and at least one provided with at least one clamping jaw arranged to be displaced conjointly towards the opposite bracket and towards, but short of the edge of the upper surface, and at least the other having a surface obliquely overhanging the work table.

In practice both brackets are provided with clamping jaws and with obliquely overhanging surfaces, so that each bracket is a duplicate of the other bracket.

The work piece rests on the upper surfaces of the two brackets, with projections, if any, suspended between them, or merely stands on these surfaces, and is both laterally clamped and pressed against these surfaces by the jaws.

Preferably each bracket is provided with a plurality of laterally separated clamping jaws, which are narrow relatively to the bracket, three being a convenient number, to enable a work piece to be held at a corresponding number of points along the surface presented to the jaws. As each jaw is separately adjustable, the clamped surface of the work piece need not be parallel to the brackets, and may even be convex.

Figure 1:
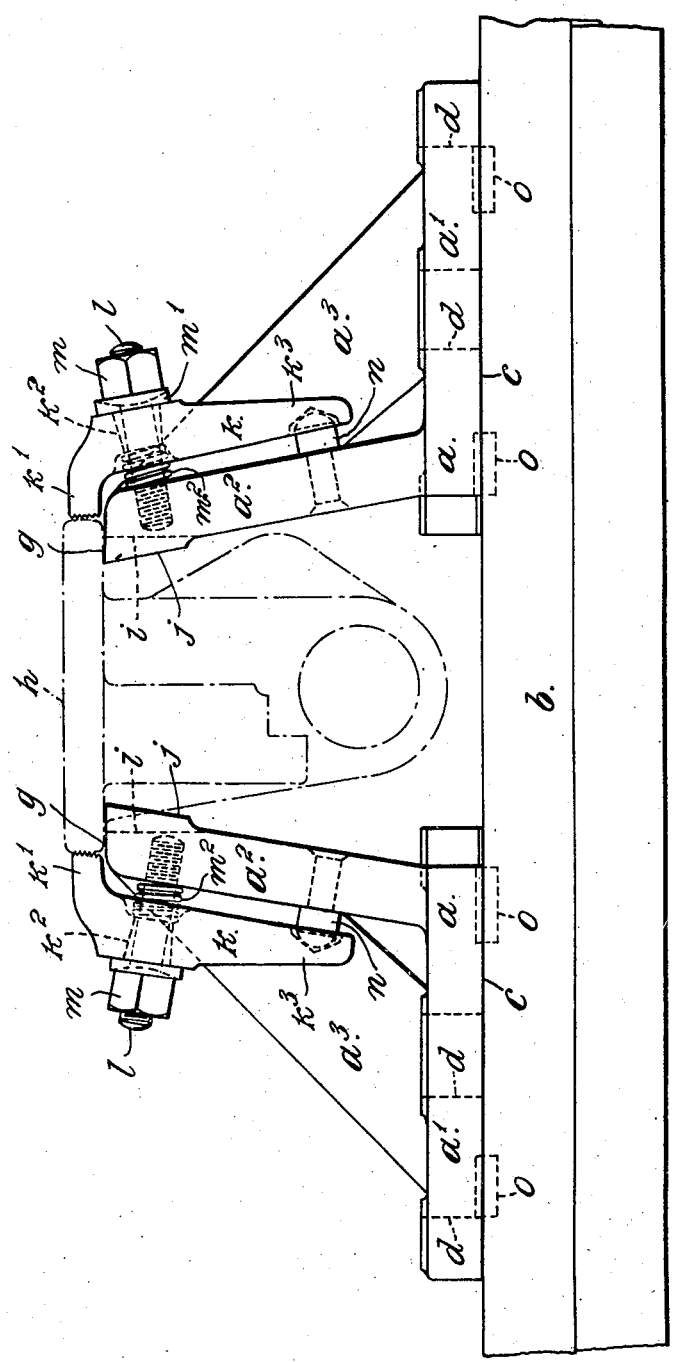

Representative examples of work piece holders according to the invention and of the manner in which they can be used, are illustrated on the accompanying drawings, in which:

Fig. 1 is a side elevation,
Fig. 2 a plan, and

Fig. 3 an end elevation of one construction of work piece holder.

Figure 4:
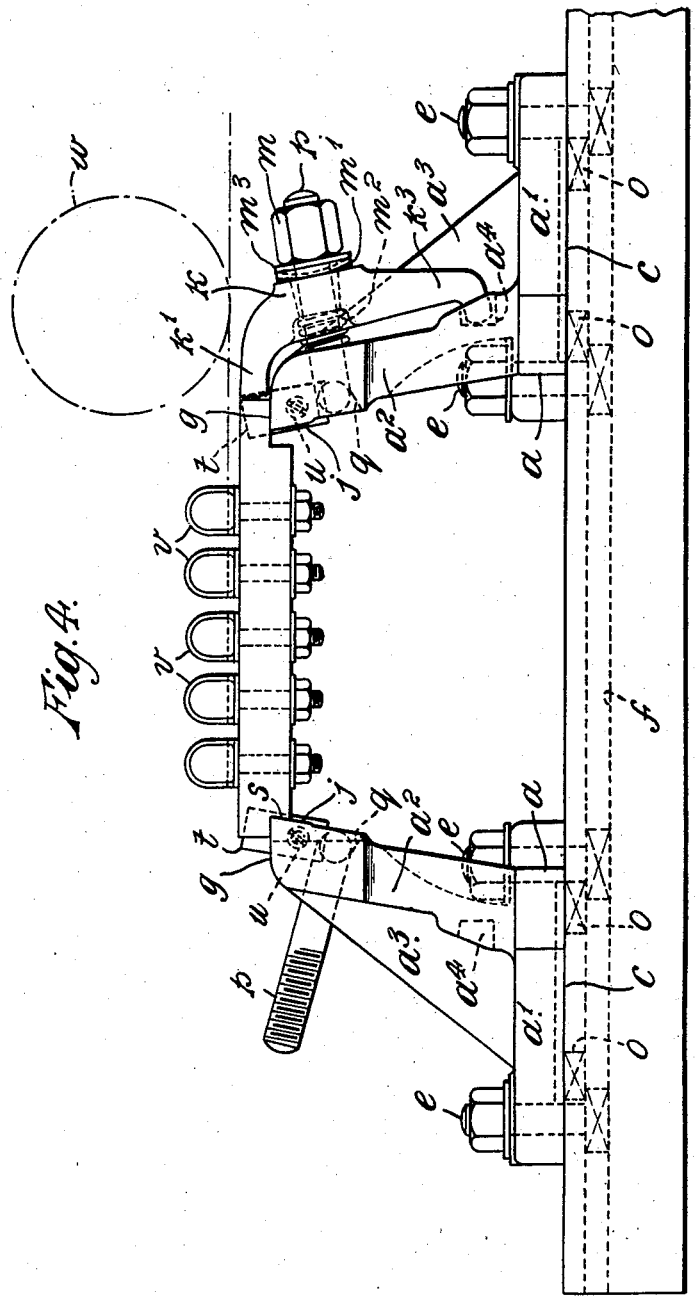
Figure 5:
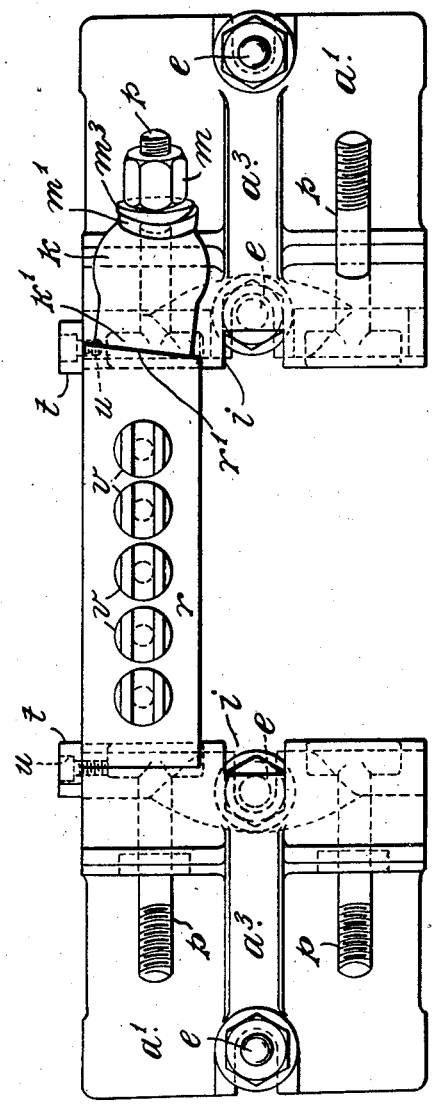

Fig. 4 is a side elevation,
Fig. 5 a plan, and
Fig. 6 an end elevation of a slightly modified form of construction of work piece holder, showing how a number of small work pieces can be held thereby for presentation to a tool of a machine tool.

Each work piece holder consists of a pair of brackets $a$ adapted to be bolted to a work table $b$ of a machine tool in opposed mutually separated parallel positions.

Each bracket $a$ is a metal block of substantially L cross section, the limbs or flanges $a^1$, $a^2$ of which are interconnected at intervals by buttress webs $a^3$. The base limb $a^1$ has a machined undersurface $c$ to rest on the work table $b$, and is slotted at $d$ to receive the stems of the usual bolts $e$, Figs. 4 and 6, engaged in the T slots $f$ of the work table $b$. The other limb $a^2$ of the L-shaped bracket block $a$, projecting away from the work table $b$, terminates in an upper surface $g$, parallel to the undersurface $c$ of the base limb $a^1$, on which upper surface $g$, the work piece $h$ is supported as shown in dot-dash lines in Fig. 1.

The upstanding limb $a^2$ of the bracket $a$ extends slightly obliquely at an obtuse angle to the base limb $a^1$ so that the two opposed brackets $a$ somewhat overhang the space between them. This gives clearance to any projections on the sides of any suspended part of the work piece. The limb $a^2$ is also notched at the upper end at $i$ to give clearance.

The upper end of the obliquely overhanging face of the upstanding limb $a^2$ of each bracket $a$ is formed with a slightly obliquely undercut machined surface $j$, the purpose of which will be described in connection with Figs. 4 to 6.

Three narrow substantially L-shaped clamping bars $k$, each with a limb $k^1$ overhanging the work piece-supporting surface $g$ of the bracket $a$, are each mounted, in the construction shown in Figs. 1 to 3, by a hole $k^2$, intermediate its ends, on a screw stud $l$, projecting from the back of the upstanding limb $a^2$ of the bracket $a$. The clamping bar $k$ is pressed towards the back of the upstanding limb $a^2$ of the bracket $a$ by a spherically based nut $m$ with concave washer $m^1$ on the screw stud $l$. A helical spring $m^2$ is interposed, on the stud $l$, between the clamping bar $k$ and the back of the upstanding limb $a^2$ of the bracket $a$. The tail $k^3$ of the other limb of the clamping bar $k$ bears against a heel pin $n$ protruding from the back of the upstanding limb $a^2$ of the bracket $a$, whereby, the clamping bar $k$ acting as a lever, the end of the overhanging limb $k^1$ thereof is forced against the work piece $h$. As the lever bar $k$ rocks about the heel pin $n$ as a fulcrum, the displacement of the overhanging limb $k^1$ thereof will also have a component towards the work table $b$ and forcing the work piece $h$ against the upper surface $g$ of the limb $a^2$ of the bracket $a$.

The engaging end surface of the overhanging limb $k^1$ of the clamping lever bar $k$ is convex and is serrated and hardened to grip the work piece $h$.

The undersurface $c$ is slotted to receive tenons $o$ engaging also in a T slot $f$ of the work table $b$.

Two pairs of the brackets $a$ can be used to clamp a work piece in two mutually perpendicular directions.

Parallel surfaced distance pieces (not shown) can be interposed between the surfaces $g$ of the brackets $a$ and a shallow work piece, so as to raise the surface to be worked of the latter, above the clamping lever bars $k$.

Instead of the clamping lever bar $k$ being mounted on a screw stud $l$ it can as shown in Figs. 4 and 5, be mounted on a T headed bolt $p$, the T head of which is seated in a recess $q$ in the overhanging face of the limb $a^2$ of the bracket $a$. Also the tail $k^3$ of the clamping bar $k$ is cranked and bears as a fulcrum in a recess $a^4$ in the back of the upstanding limb $a^2$ of the bracket $a$. Also the nut $m$ is flat based, but a pair of spherically convex and concave washers $m^3$, $m^4$ are interposed.

Figs. 4 to 6 show how a bar $r$ formed with an inwardly sloping shoulder $s$ on its underside can be held merely by the clamping lever bar $k$ of one bracket $a$ forcing the sloping shoulder into engagement with the obliquely undercut surface $j$ of the opposite bracket $a$.

The bar $r$ is positioned laterally by being thrust up against a turn button stop plate $t$ pivoted on a screw $u$ on the upstanding limb $a^2$ of the bracket $a$ and turned to protrude upwards.

A number of small work pieces $v$ to be machined, for instance by a milling cutter $w$, can, as shown, be mounted on the bar $r$. Whilst one set of articles $v$ is being machined, another set can be mounted on another bar in readiness to be held on the brackets $a$.

The end of the bar $r$ pressed by the clamping bar $k$ is oblique as shown so that such clamping bar $k$ thrusts it towards the top plates $t$, swivelling slightly in so doing.

I claim:

1. A work piece holder consisting of a pair of brackets each consisting of a metal block of obtuse angled L cross section formed in and on the base limb with bolt slots and with a flat undersurface and on the upstanding limb with a flat upper surface parallel with and in both brackets equi-distant from said flat undersurface and on the overhanging face of said upstanding limb with an obliquely undercut surface, L-shaped clamping bars mounted on the back of said upstanding limb of each said bracket and each presenting one limb overhanging said flat upper surface and fulcrumed at the end of the other limb of said clamping bar, and means for forcing said clamping bars towards the upstanding limb of the respective bracket.

2. A work piece holder consisting of a pair of brackets each consisting of a metal block of obtuse angled L cross section formed in and on the base limb with bolt slots and with a flat undersurface and on the upstanding limb with a flat upper surface parallel with and in both brackets equi-distant from said flat undersurface and on the overhanging face of said upstanding limb with an obliquely undercut surface, screw stems protruding from the back of said upstanding limb of each said bracket, an L-shaped clamping bar mounted on each said stem and presenting one limb overhanging said flat upper surface and fulcrumed at the end of the other limb of said clamping bar and a nut on each said stem at the back of each said clamping bar.

3. A work piece holder consisting of a pair of brackets each formed with a flat under surface and with a flat upper surface parallel with, and in both brackets equi-distant from said under surface, at least one clamping lever fulcrumed beneath the level of said upper surface on the back of at least one of said brackets and extending over said upper surface, and means applied to said clamping lever beneath the level of said upper surface for forcing the upper portion of said clamping lever towards said back of said bracket.

4. A work piece holder consisting of a pair of brackets each formed with a flat under surface and with a flat upper surface parallel with and in both brackets equi-distant from said under surface, a plurality of clamping levers fulcrumed beneath the level of said upper surface on the back of each said bracket and extending over said upper surface, and means applied to each said clamping lever beneath the level of said upper surface for forcing the upper portion of each said clamping lever towards said back of said bracket.

5. A work piece holder consisting of a pair of brackets each formed with a flat under surface and with a flat upper surface parallel with and in both brackets equi-distant from said under surface, at least one clamping lever fulcrumed beneath the level of said upper surface on the back of at least one of said brackets and extending over said upper surface and means applied to said clamping lever beneath the level of said upper surface and above said fulcrum for forcing said clamping lever towards said back of said bracket.

6. A work piece holder consisting of a pair of brackets each formed with a flat under surface and with a flat upper surface parallel with and in both brackets equi-distant from said under surface, a plurality of clamping levers fulcrumed beneath the level of said upper surface on the back of each said bracket and extending over said upper surface, and means applied to each said clamping lever beneath the level of said upper surface and above said fulcrum for forcing said clamping lever towards said back of said bracket.

HERBERT YATES.

REFERENCES CITED

The following references are of record in the file of this patent:

UNITED STATES PATENTS

| Number | Name | Date |
| --- | --- | --- |
| 661,322 | Ranz | Nov. 6, 1900 |
| 1,350,097 | Glover | Aug. 17, 1920 |
| 1,922,246 | Johnson | Aug. 15, 1933 |
| 1,936,263 | Pope | Nov. 21, 1933 |
| 2,302,813 | Stuhlfauth, et al | Nov. 24, 1942 |